United States Patent Office

2,932,577
Patented Apr. 12, 1960

2,932,577

REFRACTORY BRICK

Richard B. Shaw and William G. Connor, Tarentum, Pa., assignors to Allegheny Ludlum Steel Corporation, Brackenridge, Pa., a corporation of Pennsylvania No Drawing. Application June 25, 1957
Serial No. 667,967

14 Claims. (Cl. 106—59)

This invention relates to refractory materials and particularly to refractory magnesia steel furnace liners.

In the production of steel and metal products wherein the metal is made molten in a furnace, a refractory liner is conventionally constructed on the inside surface of the furnace that is designed to come into contact with the furnace heat and molten metal. This liner is usually made of bricks that are molded from particulate refractory materials, particularly magnesia. However, continuous magnesia linings are sometimes employed. The brick or liner above the slag line of the furnace is generally composed of about 60 percent magnesite (magnesia or dead burned magnesite) and 40 percent chromite (FeOCr$_2$O$_3$) while the brick or liner of the floor of such a furnace is generally composed of more pure, and thus more refractory, magnesia-containing mixtures. Although the purer magnesia brick may be desirable for use above the slag line, because of its cost and lack of availability conventional refractory magnesite-chromite containing materials are generally employed. The conventional materials consist essentially of magnesia and chromite plus small amounts of other refractories and impurities. These materials are generally blended together in various particle sizes with a binding material which is designed to impart unfired or "green" strength to the brick or furnace lining which is formed from this material. When such unfired materials are fired at temperatures in excess of about 1500° F., preferably about 2500° F., either in a kiln or during melting operations in the metal producing furnace itself, a ceramic bond forms between the refractory particles resulting in a relatively strong refractory brick or lining. The binding material providing the green strength generally volatilizes before the stronger ceramic bond is formed. Thus, there is a temperature range in which unfired refractories generally develop a weak zone or a loss in high temperature mechanical strength some place back from the hot face or area where the molten metal and furnace heat contacts the lining, where the bond designed to produce green strength burns out but the temperature is not high enough for a ceramic bond to develop. This is an area where there may be a breaking off or peeling of the refractory during firing, particularly where the refractory is being fired in the steel producing furnace. Also, a thermal gradient prevails where there is a difference in temperature of several hundred degrees between the hot face and a few inches back that further decreases the high temperature mechanical strength of the refractory. Such a thermal gradient causes uneven bonding of the refractory, thermal shock and spalling or a breaking away of the brick even after a ceramic bond has substantially formed. Metal oxides and metals such as chromium and/or iron particles are sometimes added to the refractory aggregate to improve the ceramic bonding characteristics; however, although such additions improve the refractory's mechanical properties considerable difficulties with peeling and spalling are still experienced.

It has now been found that the by-product of grinding certain types of steel may be employed as an addition to magnesia refractories to impart improved high temperature mechanical strength plus hot strength (ability to support surrounding brick) and erosion resistance.

In the processing of steel the metal surfaces of billets and plates are frequently ground with an abrasive refractory grinding wheel to remove seams, scabs and slivers. This is usually done with a swing grinder, with a result that considerable grinder dust accumulates. The grinder dust resulting from such an operation is high in metal content. Where alloys are being so ground, the alloying constituents usually are wasted because it is commercially impractical to effect a recovery of them. Nickel is frequently recovered from such waste materials; however, where the steel contains high chromium but low nickel contents the grinder dust is waste material creating a problem of disposal and a loss of the usefulness of both the iron and chromium content.

It has now been found that the grinder dust resulting from grinding high chromium-containing steels may be employed as an effective addition to magnesia refractory compositions to impart improved mechanical properties, particularly high temperature mechanical strength to the resulting furnace brick or liner.

It is an object of the present invention to provide a refractory that will exhibit improved high temperature mechanical strength, high hot strength and erosion resistance when fired.

It is also an object of the present invention to provide an unfired refractory brick that may be used to line the walls of steel making furnaces and that will fire during the operation of the steel making furnaces.

It is also an object of the present invention to provide an unfused magnesia type furnace brick that when fired will exhibit resistance to peeling and spalling.

It is a further object of the present invention to provide a method of effectively using the waste material formed from grinding chromium-containing steels.

Other objects and advantageous features can best be observed from the following description.

In the practice of this invention a grinder dust that contains from about 88% to 92% of steel particles in hair-like form, the composition of which particles includes at least 10% chromium, is mixed with a particulate refractory magnesite that consists essentially of magnesia grains and a suitable green strength binding material formed into a brick or furnace liner and dried. The grinder dust is preferably maintained within the composition range of from about 35% to 60% of the dry weight mixture. The material is generally fired at a temperature of about 2500° F. to form a ceramic bonded refractory. Firing usually takes place in the furnace lined with the refractory.

This invention is illustrated by the steps necessary to produce a brick in accordance with the present invention. In the first step, grinder dust, magnesite particles and green strength binding materials are subjected to thorough mixing. In the second step the mixed materials are molded under pressure to form a brick. The third step is a drying of the molded brick, and the last step is the firing of the brick which may take place either in a kiln or in the furnace where the material is to be employed.

The grinder dust is made up essentially of metallic particles in the range of about 88% to 92% of the total grinder dust material. These metallic particles are hair-like in shape and usually take on an appearance somewhat similar to that of steel wool. The balance of the grinder dust is refractory dust and particles from the grinding wheel itself and is present as an impurity. The magnitude of this impurity is not sufficient to have an adverse effect on the resulting magnesia brick.

Since the refractory dust removed from the grinding wheel may be regarded as an impurity, it may be said that the preferred dry weight of the metal content of the unfused refractory material is from about 31% to about 55% of steel in the form of hair-like shaped particles such as are obtained from grinding steel with an abrasive grinding wheel, the steel particles containing at least 10% chromium as an alloying constituent with the balance of the unfused composition being essentially magnesia particles.

It has been found that the grinder dust most effective in providing high temperature mechanical strength as well as erosion resistance and hot strength to the magnesia refractory is that obtained from the grinding of steels that contain a high chromium content. It is preferred that the steel being ground, and thus the metallic particles resulting from grinding, contain at least 10% chromium as an alloying component thereof. The presence or absence of other alloying components, such as nickel, does not materially alter the effect of such additions to the refractory materials so long as the base metal is iron. Thus grinder dusts obtained from grinding all of the 200, 300 and 400 A.I.S.I. types of stainless steel are applicable to the present invention. Although grinder dusts from the 200 and 300 types of stainless steel are generally treated for nickel recovery and are not available to use as an addition to refractories some of these materials usually may be found mixed with grinder dust of the straight chromium or 400 type stainless steels.

The magnesia-containing refractory material or magnesite employed may be any of the conventional magnesia-containing materials used for such purpose. Such magnesite consists essentially of magnesia plus impurities or addition agents designed to improve the properties of the resultant fired refractory. For example, commercial magnesites may contain small amounts of $Fe_2O_3$, CaO, $Al_2O_3$ and $SiO_2$ as well as MgO, and in some instances additions of $Cr_2O_3$, chromium and iron are made. These materials conventionally contain a blend of grain sizes ranging from about ¼ inch diameter to approximately 150 mesh. The purpose of the coarse material is to make it possible to press the brick better whereas the fine materials are desirable in obtaining a good ceramic bond.

The binding material employed to impart green strength or unfired strength to the resulting pressed and dried brick may be any binding material, organic or inorganic, commonly employed for such use. For example, in the present invention there was employed a sulfite liquor that is a by-product in the paper industry. Other materials useful as a binder are water glass, magnesium sulfate, etc. It is preferred to maintain the binder materials within a range of from about 3% to 5% by weight of the resulting overall composition.

Unfired bricks made in accordance with the materials in the present invention are more difficult and harder to press because the components thereof do not flow easily and therefore more pressure must be applied in making the brick. For example, pressures of from 8,000 to 10,000 pounds per square inch are generally applied in making fire brick, and from 4,000 to 5,000 pounds per square inch for making silica brick. However, in forming the brick of the present invention, pressures of about 10,000 pounds per square inch are required. Pressing is accomplished in any of the conventional brick molding apparatus and methods.

The pressed brick generally contains from about 6% to 8% moisture and is dried at a temperature from within the range of about 250° F. to 275° F. after which it is ready for use. The formed brick may be kiln fired or be used directly to line the metal producing furnace. In some instances it may be advantageous to employ a metal case or steel backing member to those areas of the brick which will not be exposed to the furnace heat such as is conventional practice in handling of such materials. The metal case provides additional strength to the unfired brick.

It is believed that the hair-like structure of the steel particles of the grinder dust provides more surface to interlock and hold together the mixture of grinder dust and magnesite in the original or unfired condition and also accelerates any reaction from firing between the magnesia and the chromium and iron of the grinder dust where the ceramic bond takes place.

The following specific examples are given to illustrate the composition and process of the present invention and in no way limit the present invention to the exact procedure or proportions set forth.

Grinder dusts obtained from grinding different stainless steel billets were analyzed and show the following composition:

Table I

|  | Heat Identification | | | | |
| --- | --- | --- | --- | --- | --- |
|  | 950 | 951 | 056 | 050 | 116 |
| C | .22 | .36 | .69 | .40 | 1.16 |
| Mn | .47 | .45 | .68 | 1.35 | .37 |
| P | .014 | .016 | .014 | .016 | .014 |
| S | .17 | .18 | .53 | .40 | .18 |
| Si | .74 | .73 |  | .45 |  |
| Cr | 13.27 | 13.22 | 13.41 | 13.73 | 13.36 |
| Ni | 2.18 | 2.38 | 1.92 | 6.76 | .034 |
| Insolubles | 3.27 | 6.39 | 9.66 | 6.35 | 10.00 |

The grinder dusts contained numerous hair-like metallic particles. Each batch of grinder dust was mixed in a ratio of one part by weight grinder dust to one part by weight refractory brick magnesite (sea water magnesite) that contains about 90% MgO and 10% CaO, $SiO_2$ and $Fe_2O_3$, plus a trace of $Al_2O_3$. A lignin sulfonate solution that is a by-product of the paper industry was added to the mixture as a binder in small quantities sufficient to effect a moldable mixture and the material was then molded into bricks. These bricks were then dried in an oven at about 250° F. and laboratory tested. Sample bricks were fired at 2910° F. for five hours in a laboratory furnace. When this cycle was completed the brick was found to have suffered no change in volume and did not slump, spall or crack. These bricks were broken with difficulty by means of a 12-pound sledge hammer. It was observed that some metal migration had occurred and that the interior of the brick remained unaltered. For this reason both the case and the core of one of the bricks were analyzed giving the following analysis:

Table II

|  | Core | Case |
| --- | --- | --- |
| MgO | 69.48 | 40.38 |
| $Cr_2O_3$ | 5.26 | 6.99 |
| FeO | 10.94 | 28.46 |
| Ni | .48 | 2.10 |

Unfired brick made of the above materials and provided with steel casings on all but one side (to face the inside of the furnace) was used to line ¼ of the walls of each of 3 carbon electrode steel melting furnaces. The quarter sections constituted an area from the slag line to the top tier of the furnace wall. The three furnaces were operated continuously in melting various grades of steel including stainless steels for a period of 5 weeks before they were relined. The brick made in accordance with this invention exhibited no spalling or peeling.

We claim:
1. An unfired refractory consisting essentially of from 35% to 60% of a grinder dust that consists essentially of steel particles having at least 10% chromium as an alloying component thereof and the balance magnesia.

2. An unfired refractory consisting essentially of from 35% to 60% of a grinder dust that contains from 88% to 92% of steel particles having at least 10% chromium as an alloying component thereof and the balance magnesia.

3. An unfired refractory consisting essentially of from 35% to 60% of a grinder dust that contains from 88% to 92% of hair-like shaped steel particles having at least 10% chromium as an alloying component thereof and the balance magnesia.

4. An unfired refractory brick consisting essentially of a mixture of from 35% to 60% dry weight of a grinder dust that contains from 88% to 92% of hair-like shaped steel particles having at least 10% chromium as an alloying component thereof, a suitable binder and the balance a refractory material that consists essentially of magnesia.

5. An unfired refractory brick consisting essentially of a mixture of from 35% to 60% of a grinder dust that consists of from 88% to 92% of hair-shaped steel particles ground from steel having at least 10% chromium as an alloying constituent and the balance essentially grinding wheel refractory dust, a suitable binder and the balance a refractory material that consists essentially of magnesia.

6. An unfired refractory brick that consists of a mixture of from 31% to 55% of hair-shaped steel particles ground from steel that contains at least 10% chromium as an alloying constituent, a suitable binder and the balance essentially magnesia.

7. The method of making an unfired refractory material which is of increased high temperature mechanical strength, high hot strength and erosion resistance which comprises mixing magnesia particles with a binding material and from 35% to 60% dry weight of the total resultant mixture of a grinder dust that consists essentially of steel particles that contain at least 10% chromium as an alloying component thereof, molding the mix and drying.

8. The method of making an unfired refractory material which is of increased high temperature mechanical strength, high hot strength and erosion resistance which comprises mixing magnesia with a binding material and from 35% to 60% dry weight of the total resultant mixture of a grinder dust that contains from 88% to 92% of steel particles having at least 10% chromium as an alloying component thereof, molding the mix and drying.

9. The method of making an unfired refractory material which is of increased high temperature mechanical strength, high hot strength and erosion resistance which comprises mixing magnesia with from 35% to 60% dry weight of the total resultant mixture of a grinder dust that contains from 88% to 92% of hair-like steel particles having at least 10% chromium as an alloying component thereof, molding the mix and drying.

10. The method of making an unfired refractory brick which is of increased high temperature mechanical strength, high hot strength and erosion resistance which comprises mixing a refractory material that consists essentially of magnesia and that contains a suitable binding material with from 35% to 60% dry weight of the total resultant mixture of a grinder dust having from 88% to 92% of hair-like shaped steel particles that contain at least 10% chromium as an alloying component thereof, molding the mix into a brick and drying the brick.

11. The method of making an unfired refractory brick which is of increased high temperature mechanical strength, high hot strength and erosion resistance which comprises, mixing a particulate refractory material that consists essentially of magnesia, a suitable binder and from 35% to 60% dry weight of a grinder dust that consists of from 88% to 92% of hair-shaped steel particles ground from a steel having at least 10% chromium as an alloying constituent and the balance essentially grinding wheel refractory dust, molding the mix into brick and drying the brick.

12. The method of making an unfired refractory brick which is of increased high temperature mechanical strength, high hot strength and erosion resistance which comprises, mixing from about 31% to about 55% dry weight of hair-shaped steel particles having at least 10% chromium as an alloying component thereof, a suitable binding material and the balance essentially magnesia, molding the mix into brick and drying the brick.

13. The method of making an unfired refractory brick which has increased high temperature mechanical strength, high hot strength and erosion resistance which comprises, mixing a particulate refractory material that consists essentially of magnesia with from 35% to 60% dry weight of a grinder dust that contains from 88% to 92% of hair-like steel particles that have a chromium content of at least 10% as an alloying component thereof, the balance of said grinder dust being essentially grinding wheel refractory particles, and from 3 to 5 weight percent of a suitable binder, molding the mixture into a brick and drying the brick at a temperature of from 250° F. to 275° F.

14. The method of making a ceramic brick which has increased high temperature mechanical strength, high hot strength and erosion resistance which comprises, mixing a particulate refractory material that consists essentially of magnesia with from 35% to 60% dry weight of a grinder dust that contains from 88% to 92% of hair-like steel particles that have a chromium content of at least 10% as an alloying component thereof, the balance of said grinder dust being essentially grinding wheel refractory particles, and from 3 to 5 weight percent of a suitable binder, molding the mixture into a brick and drying the brick at a temperature of from 250° F. to 275° F. and firing said brick at a temperature in excess of 1500° F.

References Cited in the file of this patent

UNITED STATES PATENTS 2,639,993    Heuer _____ May 26, 1953

FOREIGN PATENTS 270,300    Great Britain _____ June 14, 1928